United States Patent [19]

Wolfe et al.

[11] 4,451,901
[45] May 29, 1984

[54] HIGH SPEED SEARCH SYSTEM

[75] Inventors: Donald W. Wolfe, Ormond Beach; Richard W. Dye, Jr., Port Orange, both of Fla.

[73] Assignee: General Electric Company, Philadelphia, Pa.

[21] Appl. No.: 341,530

[22] Filed: Jan. 21, 1982

[51] Int. Cl.³ .............................................. G06F 1/00
[52] U.S. Cl. .................................................. 364/900
[58] Field of Search ..................... 364/200, 300, 900

[56] References Cited

U.S. PATENT DOCUMENTS

| | | | |
|---|---|---|---|
| 3,358,270 | 12/1967 | Crew et al. | 340/172.5 |
| 3,448,436 | 6/1969 | Machol | 340/172.5 |
| 4,118,788 | 10/1978 | Roberts | 364/900 |
| 4,255,796 | 3/1981 | Gabbe et al. | 364/900 |

Primary Examiner—Raulfe B. Zache
Attorney, Agent, or Firm—Allen E. Amgott

[57] ABSTRACT

A system for searched digitized data permitting the simultaneous searching of several queries. To minimize excessive matches of queries, the search may be limited to selected portions of each of the documents being searched.

9 Claims, 15 Drawing Figures

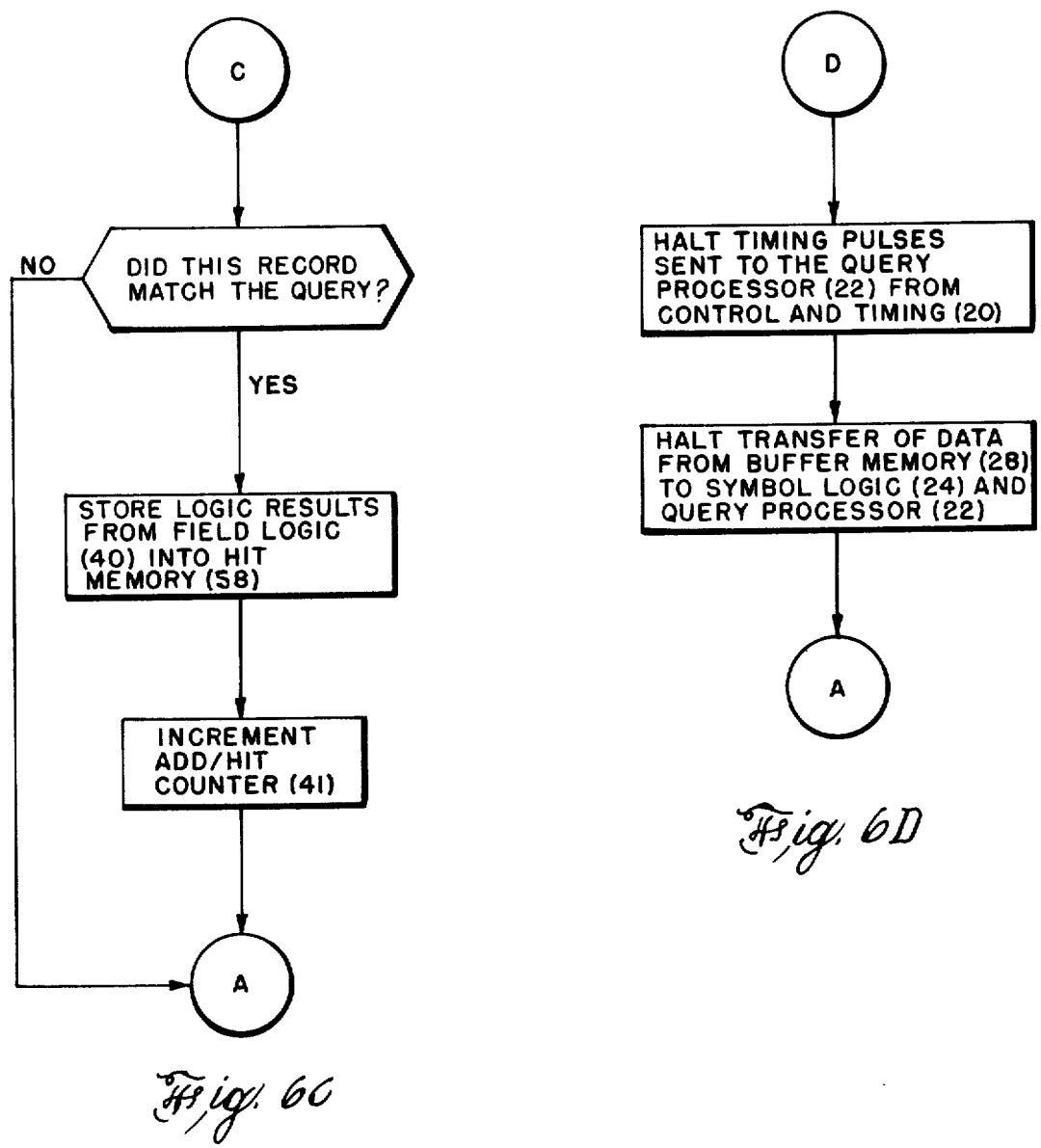

HIGH SPEED SEARCH SYSTEM

BACKGROUND OF THE INVENTION

This invention relates generally to data processing equipment and more particularly to equipment for identifying records in a data store which contain information matching a query.

Data searching using electronic data processing equipment is a practical necessity when large amounts of data must be searched. Such a search involves comparing a given sequence of characters (which will be called the "query") with the sequences of characters contained in the data to be searched. When the sequence of characters of the query is matched with the searched data, the record containing the matched sequence is identified in some fashion so that the searcher can make a further examination of it.

It is evident that if the query is solely a commonly used word and all the data is searched, the sequence of characters will be matched too often and reviewing the many identified records will be as onerous as making a manual search to begin with.

One way of reducing the number of records which will be identified in response to a query is to require that more than one sequence of characters must be compared before a record is identified for examination. As an example, instead of searching only "dog", the query may be for records containing "dog" and "bite". This technique, and others involving formulation of the query are well known in the art; see, for example, U.S. Pat. No. 3,358,270.

The capabilities afforded by the above patented arrangement have a major advantage because the entire text of records of potential interest can be stored rather than formulating and storing only synopses. Thus it is not necessary to anticipate, when storing, what part of a total record will be of interest.

Searching the total text will, in some cases, cause the identification of an excessive number of unwanted documents. This may result from the location in a document where a comparison is made. For example, a comparison might be made with words in the title of a reference at the end of a document instead of within the text of the document.

It is therefore an object of this invention to provide a high speed search system which will search only those portions of the data in a data store which have been identified for searching.

It is also an object of this invention to provide a high speed search system which will accept for simultaneous searching a plurality of queries with each of said queries having portions of the data in a data store identified for searching (which identified portions may be different for each query).

It is a further object of this invention to provide a high speed search system which will produce a list of those records which satisfy a query and will then enable the listed records to constitute a partial data store to be re-searched.

SUMMARY OF THE INVENTION

The invention is a system for searching digitized data contained in a data store at a high speed. Several queries may be processed simultaneously and the search for each query may be limited to specified portions of the records contained in the data store, e.g. only head notes, or only the bodies of the texts. The system produces a list of records which have satisfied a query. If this list is too lengthy, a refinement of the query may be for a re-search, and the records to be searched may be limited to those previously listed.

BRIEF DESCRIPTION OF THE DRAWINGS

FIG. 4 is a schematic showing in detail the character logic of FIG. 3;

DESCRIPTION OF THE PREFERRED EMBODIMENT

As an aid to understanding the invention, an example will be used in which the data in storage which is available to be searched is the textual material of a collection of United States patents. In particular, and in accordance with the invention, for each patent (herein constituting a record) is recorded in the data store the following:

a. Patent Number
b. Name of Each Inventor
c. Title
d. Date of Issue
e. Name of Assignee
f. Filing Date
g. Application Number
h. Related U.S. Application Data
i. International Class
j. U.S. Class
k. Field of Search
l. References Cited
m. Background of the Invention
n. Summary of the Invention
o. Brief Description of the Drawings
p. Description of the Preferred Embodiment
q. Claims
r. Abstract of the Disclosure Each of the datum associated with the headings of a. through r. is called a zone. A zone is of whatever length that is needed to record the information. Thus the Title may be one word or a dozen, and the Description of the Preferred Embodiment may be one page or a dozen.

Each zone is given a unique designation in the form of a string of binary digits, but that designation is the same for each record, or patent in this example. Thus the Patent Number zone may be designated 00000001. Then in the data store each time 00000001 appears, it will be followed by a patent number. By using an eight bit binary number for the zone number, 256 different zones are available for each patent. More zones than the 18 indicated by a. through r. are available for use as desired, such as by giving each independent claim a separate zone.

The dividing of each of the patents in the data store into zones, so that for a particular zone, the same type of information for each patent will be found. The searcher may choose those zones which are to be searched (herein called a zone group) and thereby avoid carrying the search process out through unwanted parts of the data store which are contained in the unchosen zones. In this manner, records which might otherwise be retrieved, will not be identified for further manual review. In the example of the data store of patents, if one is only interested in patents assigned to a particular individual, the search would be limited to the zone containing assignees and would not identify patents wherein that individual was an inventor.

Figure 1:
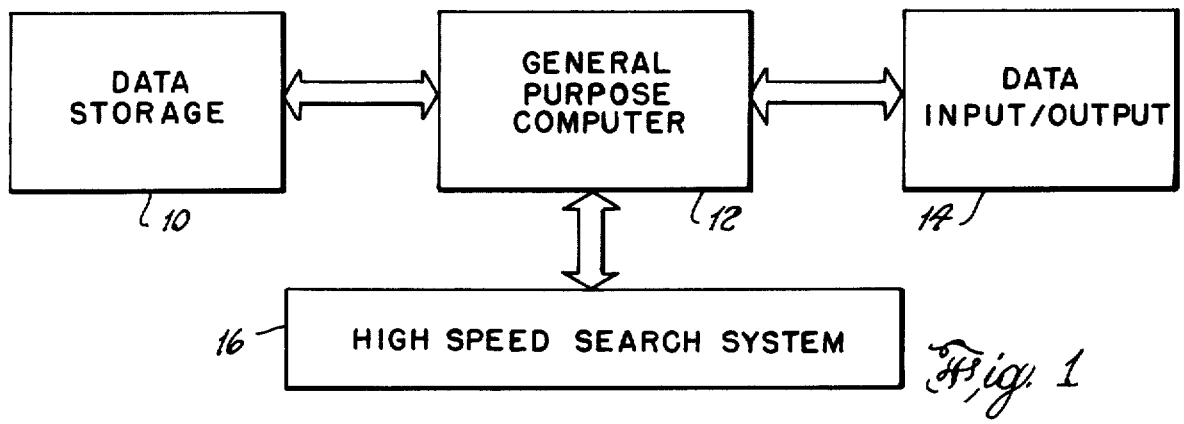
FIG. 1 is a schematic showing the high speed search system of this invention together with the conventional devices with which it is used.

Referring to FIG. 1, information which is available for searching is contained in data storage 10 which may be one or more of any conventional device used for storing digitally encoded data such as a disk, magnetic tape, etc. Access, in an embodiment which has been built, to the information in data storage 10 is through general purpose computer 12. This system employs a Digital Equipment Corporation PDP 11/45 general purpose computer, but this is an example not a limitation of what can be used. A general purpose computer as used herein; is a computer which may be programmed. It should be understood that general purpose computer 12 is only used by the system of this invention for control of transactions to and from the high speed search system to be described later, so that it is available for other purposes for the majority of the time.

Data input/output device 14 is used to transmit a query or queries to computer 12, and receives from computer 12 the results of the search which are displayed and/or printed.

High speed search system 16, which is the invention herein, receives via computer 12 the queries from data input/output device 14 and the digitized information to be searched from data storage 10. Search system 16 then relays through computer 12, the results of the search, to data input/output device 14.

Figure 2:
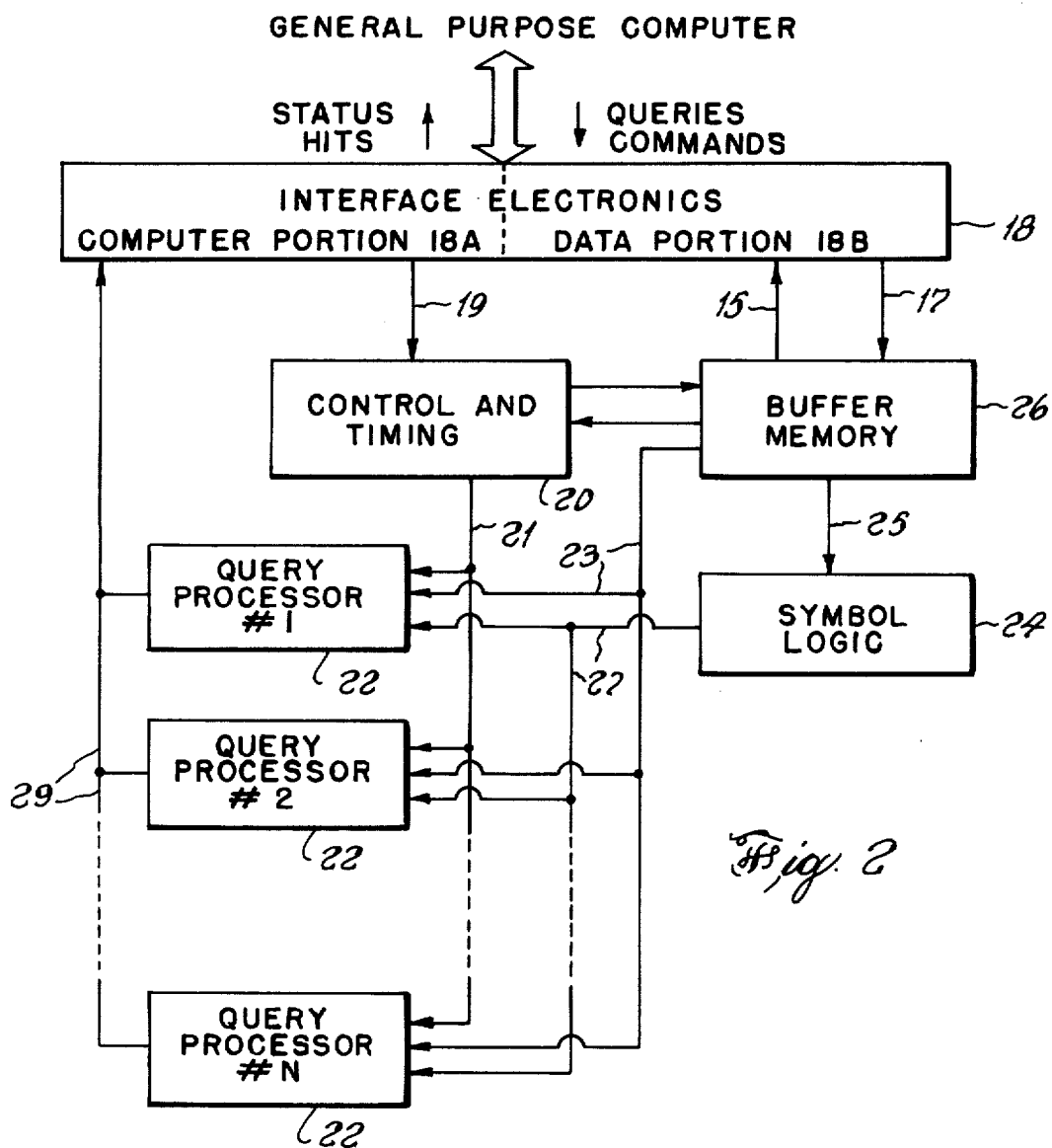
FIG. 2 is a schematic showing the components which form the high speed search system of this invention.

Turning next to FIG. 2, high speed search system 16 of FIG. 1 is shown in greater detail. Interface electronics unit 18 is the direct interface between the high speed search system and the general purpose computer illustrated in FIG. 1. Interface electronics unit 18 also transmits via line 19 information to control and timing unit 20 and data to and from buffer memory 26 via lines 15 and 17 respectively. Symbol logic 24 is connected by line 25 to receive from buffer memory 26 certain information contained in the data and to transmit signals over lines 27 to query processors 22-1 through 22-N. Query processors 22-1 through 22-N also receive information and data from control and timing unit 20 over line 21 and buffer memory 26 over lines 23. The outputs of query processors 22-1 through 22-N are delivered to interface electronics unit 18 over lines 29.

The components of the system will be considered individually beginning with the interface electronics unit 18. Interface electronics unit 18 has two independently operating portions: the computer portion 18A and the data portion 18B. The computer portion is bi-directional allowing transfer of query and command information to the high speed search system, and providing status and "hit" information to the computer. The data portion of the interface electronics unit provides for transfer of information from data storage 10 to the high speed search system under control of computer 12.

The timing portion of control and timing unit 20 provides synchronization of all portions of the high speed search system. Synchronous timing pulses are generated within control and timing unit 20 by a crystal controlled clock. By using synchronous timing, the various functions which must be repeatedly performed in the operation of the equipment are provided equal time segments even though the actual times needed may vary. This approach, while not being the most conservring of time, may be achieved with less complex apparatus.

The control logic portion of control and timing unit 20 interprets each command (commands are in the form of a string of characters) received from interface electronics 18 on line 19 to generate the control signals necessary for the function commanded to be carried out. It should be understood that while line 19 is FIG. 2 is illustrated as a single line, this is a schematic representation of what may be a plurality of electrical conductors. This also is the case with other lines in the drawings.

Control and timing unit 20 receives from the computer portion 18A of interface electronics unit 18 several different categories of information. The queries, examples of which have been described in the aforementioned U.S. Pat. No. 3,358,270, are sent to unit 18 and then to query processors 22-1 through 22-N. Candidate lists, which are categories of the data to be searched, are also sent through this route to the query processors. These candidate lists are typically prepared by the operator for the search initially. Then if the search produces an excessive number of records as hits (matches to the original query) the query may be restated and the hit list resulting from the first search may be used as the candidate list for a new or re-search.

Zone groupings are also provided by the operator to each of the query processors via the control and timing unit 20. As previously indicated, each record may be divided into 256 zones (in the embodiment built). All 256 zones must be assigned to one of eight zone groups by the operator.

Control and timing 20 sends to buffer memory 26 the addresses for the data coming from data storage 10. These addresses are locations within buffer memory 26 where the data will be stored and are commanded by general purpose computer 12 (FIG. 1).

Control and timing unit 20 also sends control signals to buffer memory 26 which direct buffer memory 26 to "dump" or send its contents to the query processors over lines 23; to read its contents back into data storage 10 (for diagnostic purposes); and to write into its memory at the appropriate addresses, information from data storage 10.

Symbol logic unit 24 receives the data in buffer memory 26 at the same time it is sent to the query processors for search. Typically, unit 24 may be a suitably programmed Programmable Read Only Memory (PROM). In symbol logic unit 24, eight symbol types may be directed to cause various control functions. The symbol types (which are characterized by digital codes) are as follows: (1) beginning of record, (2) end of record, (3) end of segment, (4) end of block, (5) zone delimiter, (6) end of word, (7) space code, and (8) null codes. It should be noted that one or more symbol types such as "end of word" may be characterized by the code for a period, space, question mark, etc.

"Record", as previously indicated, refers to a complete document such as a patent. A "block" of records is a division of records in data storage which is a maximum of 127 records (in the system which has been built). This limitation results because each record must have a unique identification or sequence number in a search and numbers zero through 126 are available. If a "block" is more than 128,000 characters it is divided into "segments" of a maximum of 128,000 characters or bytes which is the capacity of buffer memory 26. "Word", in addition to its usual meaning, includes numbers, abbreviations any string of characters ended by period, etc.

*Beginning of record* initializes query processors 22 and prepares them to search the following record. In addition, it identifies the record sequence number and applies it to the query processors.

*End of record* indicates to the query processors that a search report has been completed. The query processors then record the results of the record search.

*End of segment* is applied to control and timing 22 and thereby terminates the transfer of information from buffer memory 26.

*End of block* is applied to control and timing 22 and thereby terminates the transfer of search data. It also causes query processors 22 to be polled for the number of matches or hit counts and to transfer these to interface electronics 18 for further transfer with hit status data to computer 12.

*Zone delimiter* indicates to symbol logic 24 that the following text character is a zone number. The zone number is then applied to the query processors for zone satisfaction requirements in a query.

*End of word* is either a space or punctuation delineating the end of a word.

*Space code* suppresses the clock within the system (located in unit 20) if the data stream being searched contains two or more consecutive blank characters (e.g. spaces). When the clock is suppressed, timing pulses are not sent to the query processors although the data continues to pass through them. A series of blank spaces thereby appears as a single blank space.

*Null codes* permit the user to ignore selected control codes and nonvalid text codes in the data stream by suppressing the clock.

When the block of records has been searched, a list of documents which have satisfied a query is produced at input/output device 14. This has been called a "hit" list. If the hit list is more extensive than the operator desires, the hit list may be used as a candidate list of documents which will be searched again using a more restrictive or different query.

Referring to FIGS. 1 and 2, an operator enters a query in data input/output device 14 which is directed to the first available query processor 22. The query initially contains zone grouping information. Each of the 256 available zones must be assigned to one of eight zone groups. These group assignments may be stored in the software of general purpose compute 12 using code names to identify them. The query also contains the term or terms to be searched.

Figure 3:
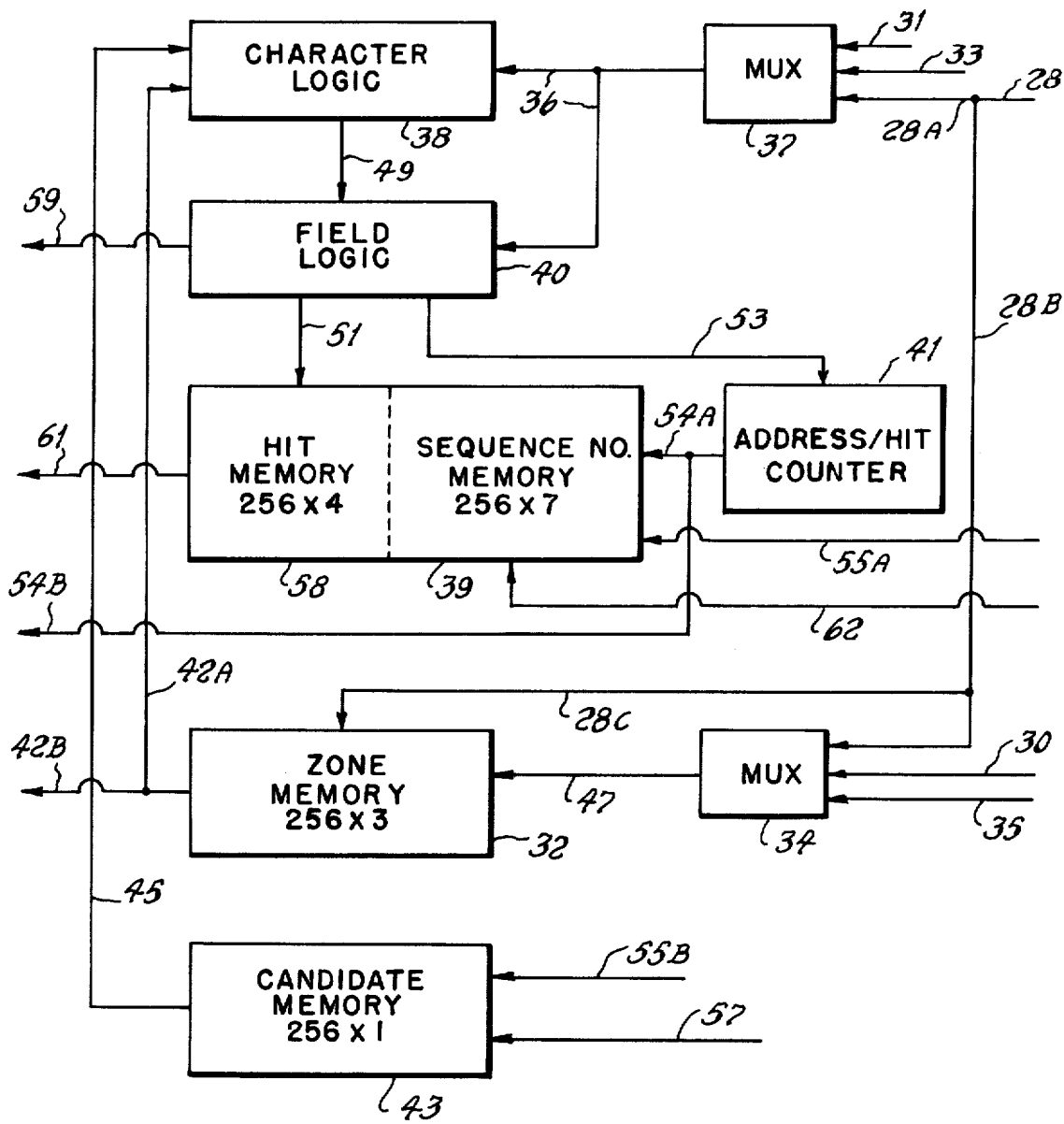
FIG. 3 is a schematic showing the components of a query processor of FIG. 2.
Figure 2:
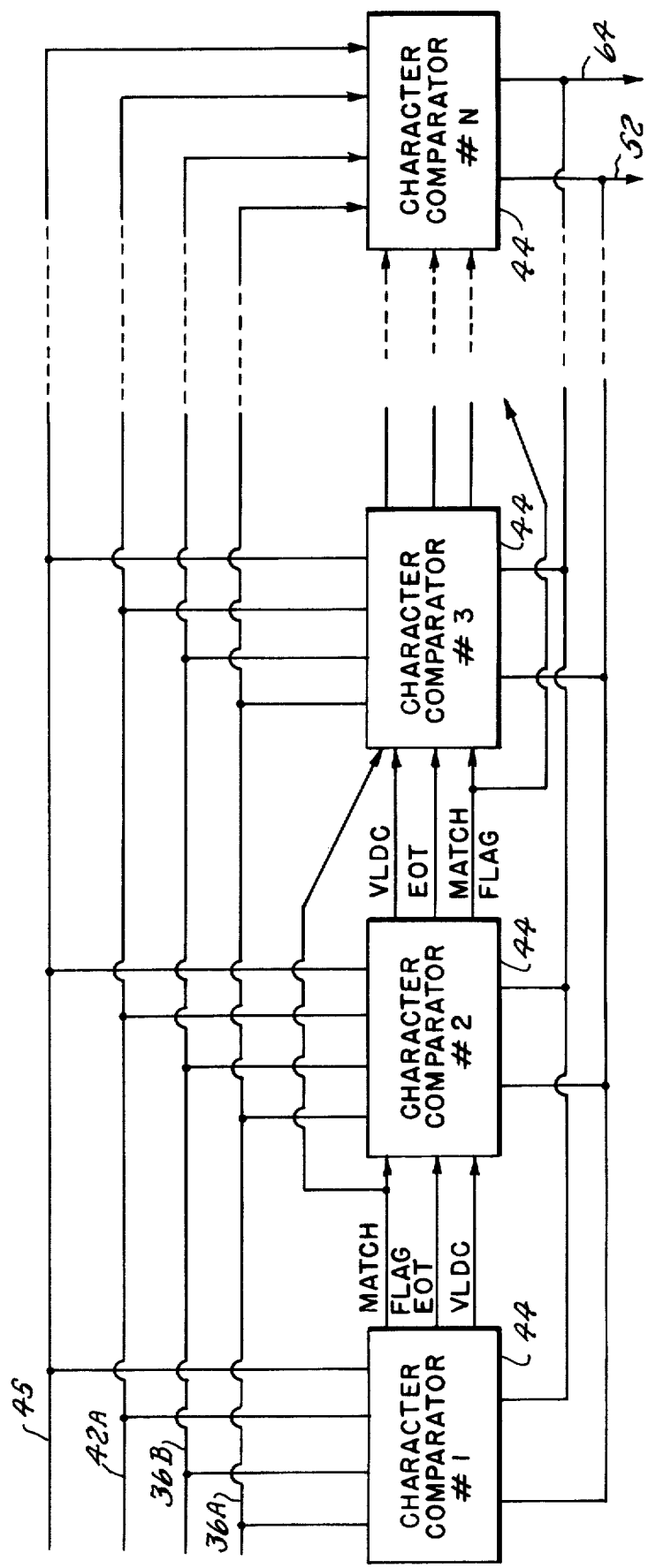

Turning now to FIG. 3, a single query processor is shown in detail. Multiplexer 37 is connected to receive control inputs from control and timing unit 20 on line 31, data from buffer memory 26 on line 33 and queries from control and timing unit 20 on line 28A (via line 28). The output of multiplexer 37 is sent to character logic 38 and field logic 40 on line 36. Multiplexer 34 is connected to receive queries from control and timing unit 20 on line 28B (via line 28), zone numbers from buffer memory 26 on line 30 and control inputs from control and timing unit 20 on line 35. The output of multiplexer 34 is sent to zone memory 32 on line 47. Zone memory 32 is also connected by line 28C to receive zone numbers from control and timing unit 20.

Field logic 40 is connected to character logic 38 by line 49. Hit memory 58 is connected by line 51 to field logic 40. Field logic 40 is also connected by line 53 to address/hit counter device 41. Lines 54A and 54B carry the output of address/hit counter device 41 to sequence number memory 39 and to interface electronics unit 18, respectively. Sequence number memory 39 is also connected to receive sequence numbers on line 55A from buffer memory 26. In addition, line 62 carries to sequence number memory 39 commands from control and timing unit 20.

Candidate memory 43 is connected by line 55B to also receive sequence numbers from buffer memory 26 and by line 57 to receive candidate bits from control and timing unit 20. Candidate memory 43 is connected by line 45 to character logic 38.

Zone memory 32 is connected by line 42A to provide an output to character logic 38 and by line 42B to provide its output to interface electronics unit 18.

Field logic 40 and hit memory 58 also provide outputs to interface electronics unit 18 on lines 59 and 61 respectively.

The query which has been directed to the query processor is carried on line 28. The zone grouping and address portion of the query proceeds via line 28B with the zone grouping portion going to zone memory 32 on line 28C. The address information is sent to multiplexor 34 and from there to zone memory 32. This address information identifies the location within the zone memory where the zone grouping data is to be stored. The remainder of the query, containing the terms to be searched, proceeds via line 28A to multiplexor 37 and via lines 36 to character logic 38 and field logic 40. Field logic 40 receives in the query the proximity and threshold information and Boolean logic. Field logic 40 sends an incrementing signal to address/hit counter 41 each time a document satisfies a query. Address/hit counter 41 then directs sequence number memory 39 to store this "hit" at a particular location.

Field logic, 40 also sends upon command the contents of its chip to interface electronics 18 over line 59.

The terms to be searched constitute a term group. The user may establish a threshold number of terms in the term group which must be found in a single record in order for that record to be identified as a "hit" or record of interest.

Each of the query processors 22-1 through 22-N may have up to four term groups which may be logically connected. Field logic 40 assures that the threshold has been met, performs the query resolution of the Boolean logic and resolves proximity where this is a requirement. Proximity is the maximum number of words or characters which may separate a term in a first term group from a term in a second term group.

Character logic 38 performs the matching of terms and assures that the matched term is in a proper zone. It will be noted that line 42A provides the necessary zone information to character logic 38 so that the latter check can be made. The character logic identifies which terms of the query were found in each record and provides this information to field logic 40. Field logic 40 performs the Boolean logic which determines whether a query has been satisfied and stores in hit memory 58 identification of those documents which have satisfied the query—the hit list. If this hit list is excessive, an additional term or terms to more specifically define the query can be made, but limited to only those records identified in the hit list. The user has the option of specifying the extent of the re-search to be made, that is all or a portion of the hit records, or all records again. This hit list is provided to candidate memory 43 as a candidate list for the re-search. The candidate list in candidate memory 43 may also be produced initially by the user if the user knows the search should be limited to specified documents. In practice, the candidate list is placed in candidate memory 43 and as the running of the search data from buffer memory 26 proceeds, the sequence numbers of the records which are coming from buffer memory 26 are sent to candidate memory 43. If these sequence numbers are contained in candidate memory 43, a "search" signal is sent via line 45 to character logic 38.

It will be noted that the capacity of candidate memory is indicated on FIG. 3 as 256 bits. This is double the number of documents which may be contained in buffer memory 26. The additional capacity permits the loading of a second candidate list while the first is stored. This additional capacity is preferably also provided in hit memory 58 and sequence number memory 39.

Returning to FIG. 2, the 128,000 bytes contained in buffer memory 26 go to both symbol logic 24 and control and timing 20. Symbol logic 24 responds to characters indicating zone numbers or record numbers which are desired and signals the query processor upon each occurrence.

FIG. 4 illustrates the operation of character logic 38 in greater detail.

Line 36A carries the query characters each of which is loaded into a different character comparator. Line 36B then carries the search data which is compared, character by character. The candidate list signal carried on line 45 directs that data in a record should be searched or not searched. The zone number carried on line 42A enables character logic 38 to decide whether a zone should be searched or not searched.

Character logic 38 is simply a series of comparators which determines when a character string of the given query matches with the character string being searched. It is not responsible for resolving the threshold, Boolean, or proximity logic of the query, this is done by field logic 40. Each comparator 44 of FIG. 4 is loaded with a single character of the query. If comparator 44—(N) is loaded with the last character of a character string then the neighboring comparator 44—(N+1) is signalled using the End-of-Term (EOT) signal. If a comparator 44—(N) is loaded with a Variable Length Don't Care (VLDC) character then the neighboring comparator 44—(N+1) is notified using the VLDC line. No comparator may match with an incoming character unless the following conditions are met.

The given zone number must be a valid zone number for the given query term.

The candidate data must request a search of the incoming record.

At least one of the following must be true with respect to comparator 44—(N)

Comparator 44—(N−1) must have found a match and set the match flag line.

Comparator 44—(N−1) contains the last character of the previous query character string and the character being examined is the first character of a word. Indicated by the end-of-term (EOT) line.

Comparator 44—(N−1) contains a VLDC and comparator 44—(N−2) has found a match and set its match flag line.

When the last comparator of a query character string completes a match, the next input character is examined for an end-of-word character. If an end of word is detected, then the comparator outputs a signal to the field logic indicating that the character string has been matched. Two types of signals are outputted. One indicates that a match has been made and is outputted one line 64 every time a match is made in the record. The other is outputted on line 52 only the first time a match for the particular character string is made within each record.

Figure 5:
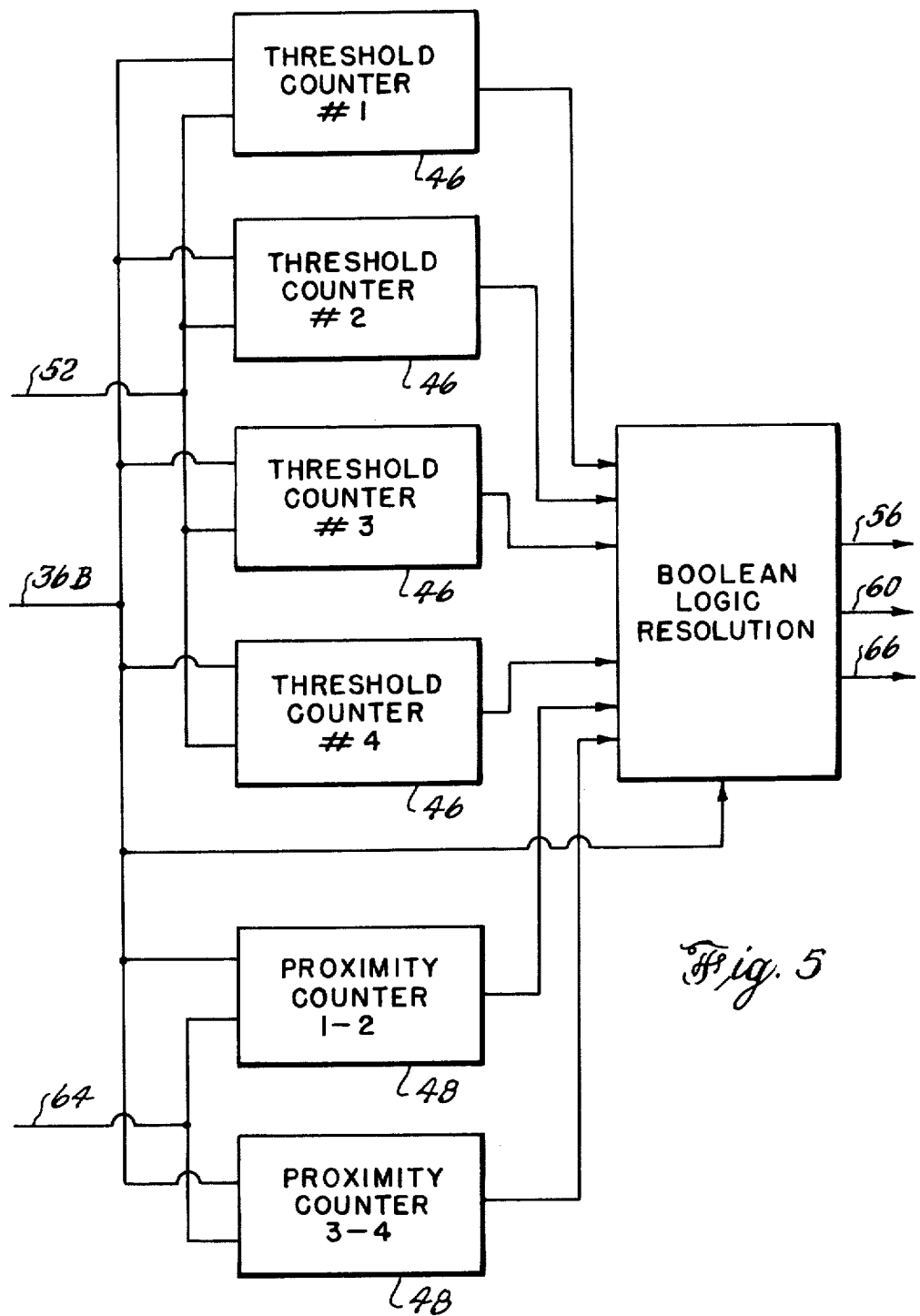
FIG. 5 is a schematic showing in detail the field logic of FIG. 3.

Field logic 40 of FIG. 3 is shown is greater detail in FIG. 5. The field logic maintains the thresholds for each of the four term groups, processes all proximity logic of the query, and provides the necessary Boolean logic resolution to determine whether a record satisfies the given query.

A query contains character information which is loaded into character logic 38 (FIG. 3), and threshold values, proximity distances, and Boolean logic relationships which are loaded into threshold counters 46, proximity counters 48, and Boolean logic resolution 50 of the field logic respectively. As the character logic locates the terms of the query in the incoming record, the First Term Match line 52 and Every Term Match line 64 are used to signal field logic 40. The First Term Match will signal the first, and only the first, occurrence of a term in an incoming record. This is then used by the field logic to decrement the appropriate threshold counter 46. When a threshold counter reaches zero, Boolean logic resolution 50 is notified that the term group query requirements have been satisfied.

If the query includes proximity, then the proximity counters 48 are loaded with the required distance. Every Term Match line 64 is used which indicates every occurrence of a term in the incoming record. A signal on this line begins a countdown of the proximity counter. If the second term involved in the proximity requirement is encountered before the count reaches zero, then the requirement has been satisfield and Boolean Logic Resolution 50 is notified.

At the end of each record, Boolean Logic Resolution 50 evaluates the results from the threshold and proximity counters to determine whether or not the record satisfies the query. If the record does match the query requirements, then HIT line 56 is signalled and the threshold proximity counter results are outputted on line 66 for storage in HIT memory 58 of FIG. 3 and eventual outputting to general purpose computer 12 (FIG. 1).

Content output line 60 allows the general purpose computer to read out the Boolean logic expression being evaluated by the Boolean Logic Resolution module 50.

Figure 6A:
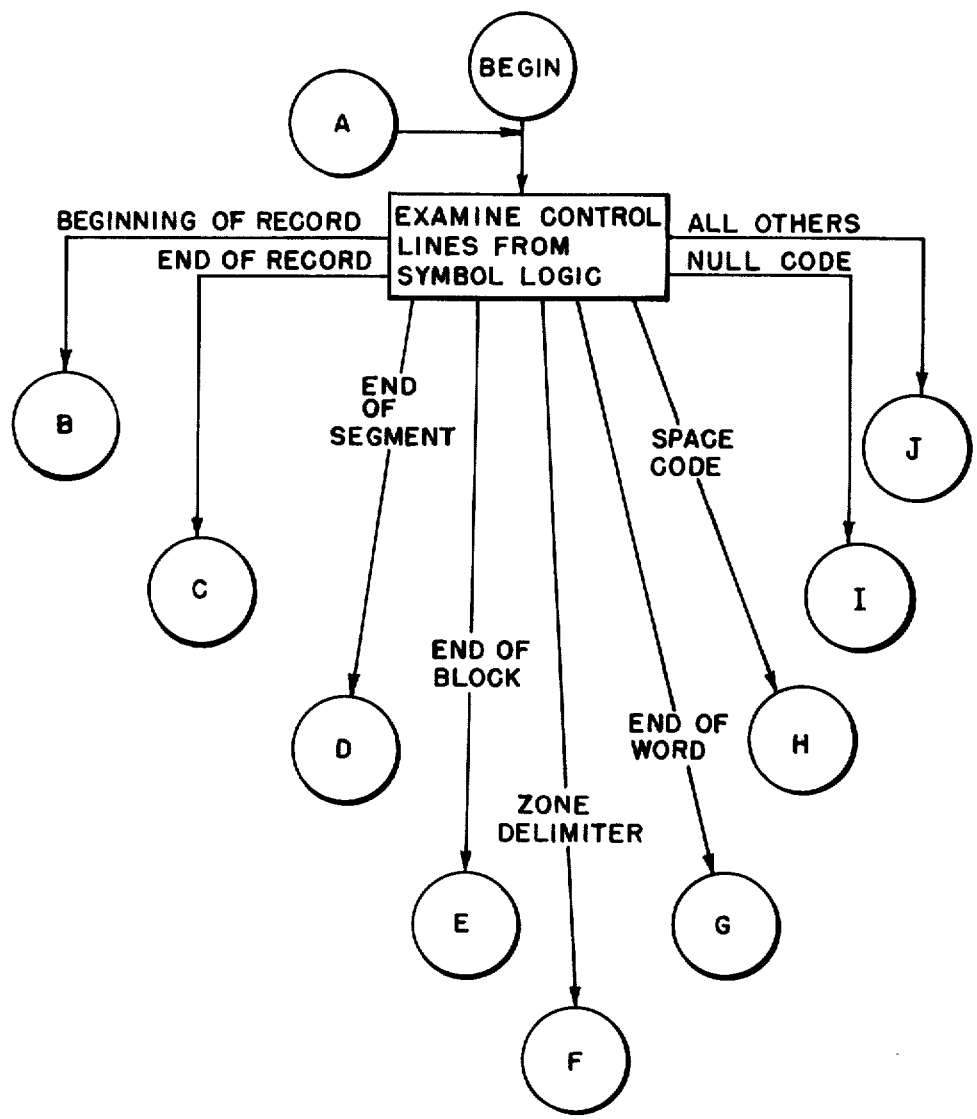
FIG. 6A is a graphical representation of commands which may be sent to a query processor with FIGS. 6B–6J presenting the implementation of these commands.
Figure 6B:
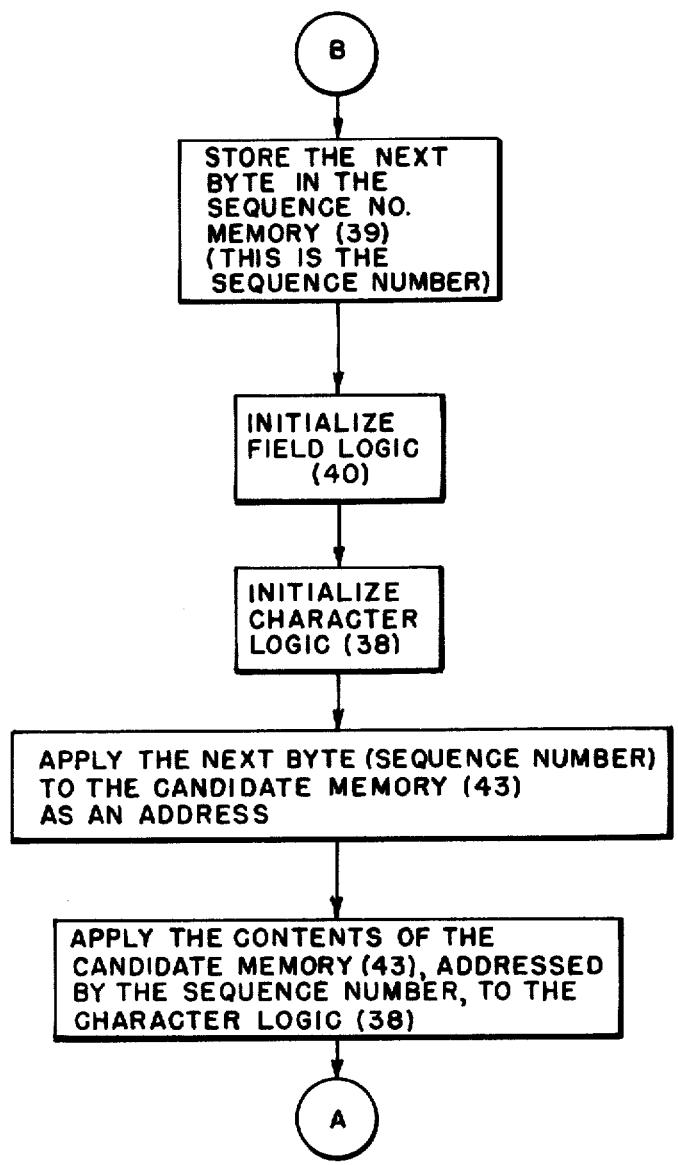
Figures 6E, 6F:
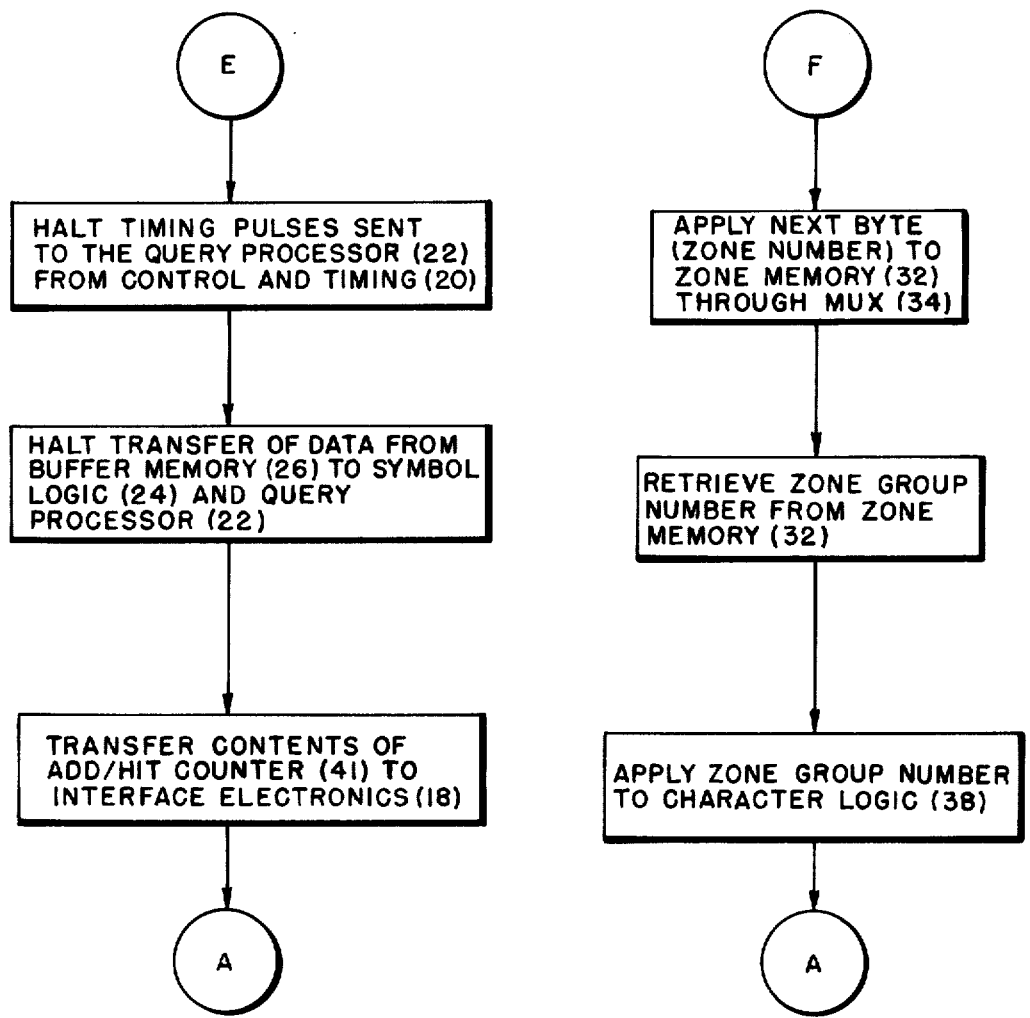
Figure 6G:
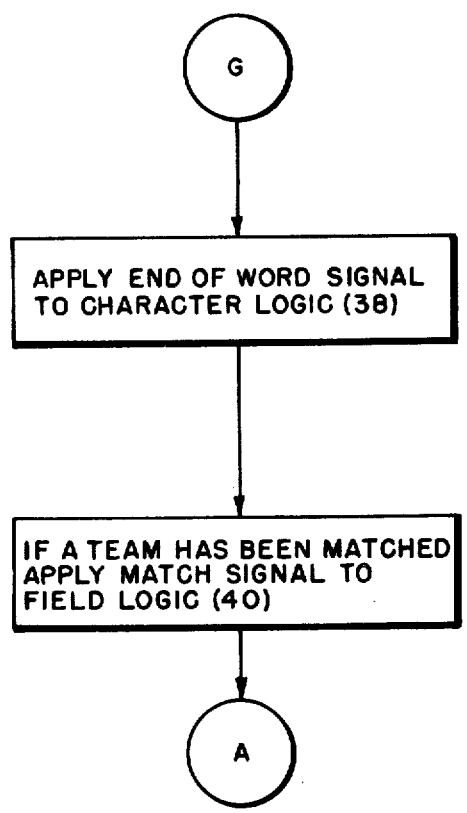
Figure 6H:
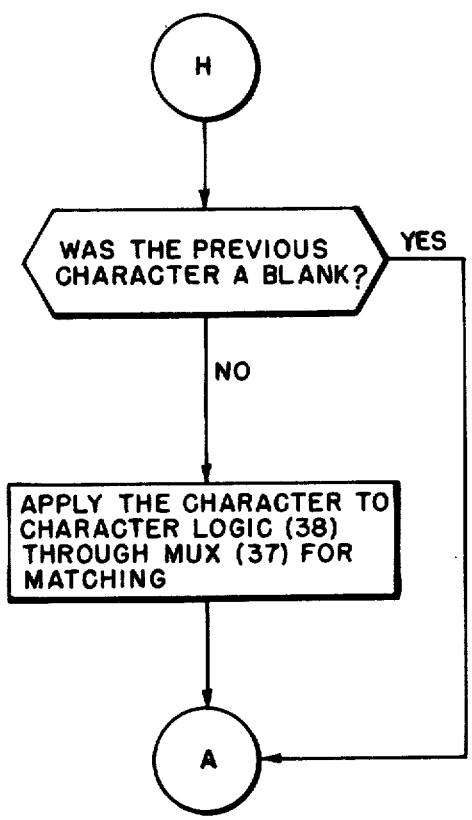
Figures 6I, 6J:
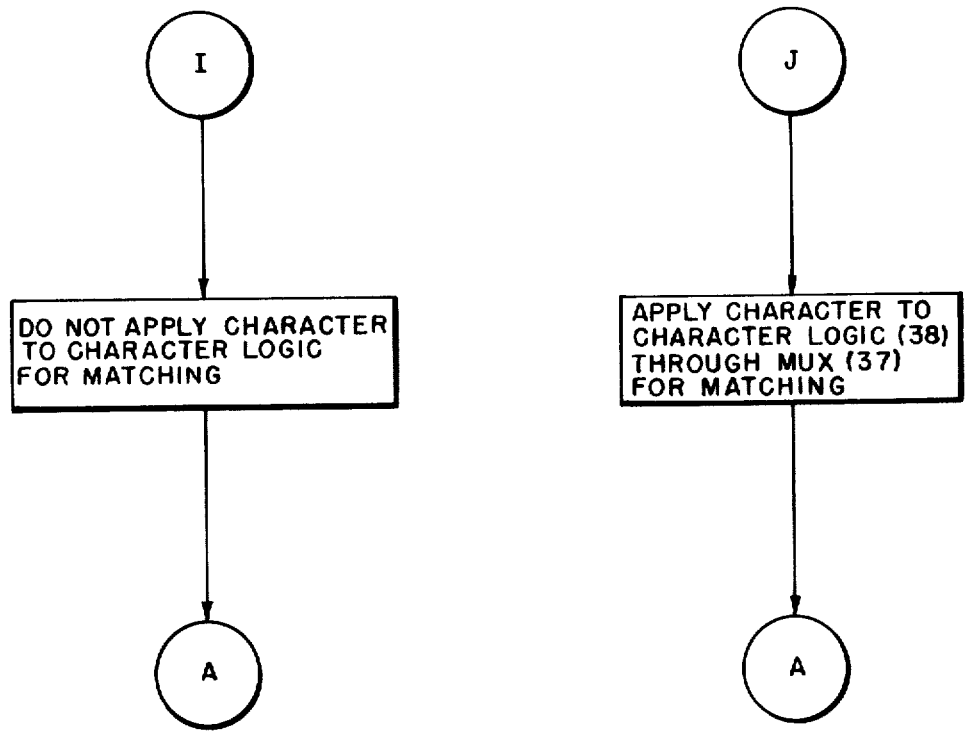

Referring now to FIG. 6A, the eight control signals which may be sent to query processors 22 are graphically shown terminating in circles labeled B through I. The "all others" which terminates in J, represents the situation where the characters sent to a query processor are not one of the eight control signals. FIGS. 6A through 6J present in flow chart form a portion of the information previously presented in the text.

Although a particular embodiment of a high speed search system has been illustrated and described, it will be obvious that changes and modifications can be made without departing from the spirit of the invention.

We claim:

1. A high speed search system for operation in conjunction with a general purpose computer having a data storage device containing records in the form of digitized information and a data input/output terminal connected to it comprising:

interface means for receiving queries and commands from said data input/output terminal and a portion of the digitized information from said data storage device;

said interface means also transmitting search results to said data input/output terminal;

a query processor;

a symbol logic unit;

buffer memory means for containing said portion of the digitized information from said interface means, and applying said portion to said symbol logic unit and said query processor;

each of said records having zones identified therein;

said query processor receiving (a) a query defining data to be located, and (b) all the digitized information from said buffer memory means;

control and timing means for receiving said queries and commands from said interface means;

said symbol logic unit receiving said digitized information from said buffer memory means, recognizing control character sequences and applying corresponding control signals to said query processor; and said query processor searching only that portion of said digitized information from said buffer memory means as is contained in the zones and records it has been directed to search, and providing search results to said interface means.

2. A high speed search system in accordance with claim 1 wherein:

said query processor contains character logic means wherein the characters of its query are compared with the characters in the digitized information it has been directed to search.

3. A high speed search system in accordance with claim 1 wherein:

said query processor contains field logic means for determining whether a matched term meets other requirements of a query.

4. A high speed search system in accordance with claim 1 wherein:

said query processor contains a zone memory for containing one or more zone groups identifying zones of each record to be searched.

5. A high speed search system for operation in conjunction with a general purpose computer having a data storage device containing records in the form of digitized information and a data input/output terminal connected to it comprising:

interface means for receiving queries and commands from said data input/output terminal and a portion of the digitized information from said data storage device;

said interface means also transmitting search results to said data input/output terminal;

a plurality of query processors;

a symbol logic unit;

buffer memory means for containing said portion of the digitized information from said interface means, and applying said portion to said symbol logic and said plurality of query processors;

each of said records having zones identified therein and having a unique sequence number in said buffer memory;

each of said query processors receiving (a) a query defining data to be located, and (b) all the digitized information from said buffer memory means;

control and timing means for receiving said queries and commands from said interface means;

said symbol logic unit receiving said digitized information from said buffer memory means, recognizing control character sequences and applying corresponding control signals to said query processors; and each of said query processors searching only that portion of said digitized information from said buffer memory means as is contained in the zones and records it has been directed to search, and providing search results to said interface means.

6. A high speed search system in accordance with claim 5 wherein:

each of said query processors contains character logic means wherein the characters of its query are compared with the characters in the digitized information it has been directed to search.

7. A high speed search system in accordance with claim 5 wherein:

each of said query processors contains field logic means for determining whether a matched term meets other requirements of a query.

8. A high speed search system in accordance with claim 5 wherein:

a plurality of data input/output terminals are connected to said general purpose computer; and each of said data input/output terminals is capable of utilizing one or more query processors.

9. A high speed search system in accordance with claim 5 wherein:

each of said query processors contains a zone memory for containing one or more zone groups identifying zones of each record to be searched.

* * * * *